Patented Dec. 4, 1945

2,390,078

UNITED STATES PATENT OFFICE 2,390,078

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 26, 1944,
Serial No. 542,233

5 Claims. (Cl. 252—341)

This invention relates to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or brines. Controlled emulsion and subsequent demulsification, under the conditions just mentioned, is of significant value in removing impurities, particularly inorganic salts, from pipeline oil.

Demulsification, as contemplated in the present application, includes the preventive step of commingling the demulsifier with the aqueous component, which would or might subsequently become either phase of the emulsion, in absence of such precautionary measure.

The new material herein described, that is used as the demulsifier of our process, consists of a compound or mixture of compounds that comprises the ester derived by reaction between a low molal acid having less than 8 carbon atoms and a hydroxylated basic amine having at least one radical containing 8 carbon atoms or more. Such type of compound may be exemplified by the following formula:

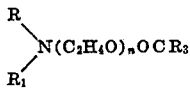

in which R is a non-aryl hydrocarbon radical free from ether linkages and containing 8 carbon atoms and not more than 32 carbon atoms, and more particularly, an alkyl radical, an alicyclic radical, an aralkyl radical, etc. $R_1$ is the same as R, or the same as R without the lower limitation of 8 carbon atoms, or additionally, may be a hydroxyalkyl radical including hydroxyalkyl radicals, where the carbon atom chain is interrupted at least once by an oxygen atom. The alkyleneoxy radical may, of course, be any alkyleneoxy radical, particularly one derived from ethylene oxide, propylene oxide, butylene oxide, glycid or methylglycid. $n$ represents any small number, but preferably 3 or less. $R_3CO$ is the acyl radical of a low molal monocarboxy acid, such as acetic acid, hydroxyacetic acid, butyric acid, lactic acid, hexanoic acid, heptoic acid, benzoic acid, hexahydrobenzoic acid, etc. The hydrocarbon atom R may have as many as 32 carbon atoms. The amino nitrogen atom must be free from directly linked acyl radicals or aryl radicals. Stated another way, the nitrogen atom must be a basic amino nitrogen atom. See "Textbook of Organic Chemistry," Richter, second edition, page 253.

Amines of the kind contemplated and used as primary reactants in producing the compounds herein contemplated, are produced in various manners. They may be produced from naphthenic acids, resin acids, fatty acids, or oxidized petroleum acids, or the like, by converting the acid into the ester, preferably the ethyl ester, or the like, and then converting the ester into the alcohol. Such alcohols, derived from various higher fatty acids, naphthenic acids, oxidized petroleum acids, resin acids, and the like, are available commercially and are employed in the manufacture of wetting agents or the like by sulfating or sulfonating such alcohols. Such high molal alcohols can be converted into the chlorides, and the chlorides reacted with ammonia or a primary or secondary amine to give amines of the type herein contemplated as reactants. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid, or some other hydroxy acid, such as hydroxystearic acid, such amines include a hydroxylated hydrocarbon radical.

In actual practice amines of the kind herein contemplated as reactants can be obtained in various ways. Reference is made to a number of patents which disclose or describe such amines, or the method of manufacturing the same. In some cases obvious modifications will be required to produce amines of the kind herein contemplated; but such modifications would be evident to a skilled chemist, without further discussion. See the following patents: U. S. Patent Nos. 1,951,469, Bertsch, Mar. 20, 1934; 2,006,058, Olin, June 25, 1935; 2,033,866, Schrauth, Mar. 10, 1936; 2,074,380, Flett, Mar. 23, 1937; 2,075,825, Nafash, April 6, 1937; 2,078,922, Arnold, May 4, 1937; 2,091,105, Piggott, Aug. 24, 1937; 2,108,147, Speer, Feb. 15, 1938; 2,110,199, Carothers, Mar. 8, 1938; 2,132,902, Lenher, Oct. 11, 1938; and 2,178,522, Ralston, Oct. 31, 1938;

British Patent Nos. 359,001, Johnson, on behalf of I. G. Farbenindustrie, A.-G. 1932; and 358,114, Carpmael, on behalf of I. G. Farbenindustrie, A.-G. 1932. Also note: Industrial & Engineering Chemistry, Industrial Edition, volume 32, No. 4 (1940), p. 486.

In view of what has been said, it will be noted that the group introduced into the amine molecule and derived at least hypothetically from an acid, is really the carbon atom chain radical of the acyl group of the acid or hypothetical acid, along with what was at least hypothetically the carbonyl carbon atom. For the sake of convenience, this radical will be referred to as a hydrocarbon radical; and it is intended to include derivatives in which a hydrogen atom, or a small number of hydrogen atoms, have been replaced by the hydroxyl radical; for instance, the hydroxy hydrocarbon radical which would be supplied by ricinoleic acid, hydroxystearic acid, dihydroxystearic acid, or the like. In the present instance, such usage seems eminently correct, in that the hydrocarbon radical supplies the hydrophobe portion of the amine, and this hydrophobe portion is not changed markedly by the presence of one or two hydroxyl groups, as are present in the case of ricinoleic acid, hydroxystearic acid, or the like; and such hydroxyl groups are essentially non-functional, in that they are not necessarily relied upon to supply points of chemical activity, as far as the herein contemplated compounds are concerned. They may slightly decrease the hydrophobe character of the radical to some degree; but this cannot be significant, as can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon", is intended to include the hydroxy-hydrocarbon type of the kind in which the hydroxyl group does not materially reduce the hydrophobe character of the hydrocarbon group, as, for example, the group or radical which would be obtained from ricinoleic acid. The presence of such hydroxy radical would require an extra mole of low molal carboxy acid, to insure an ester radical of the kind hereinafter described.

In addition to synthetic carboxy acids obtained by the oxidation of paraffins or the like, there is the somewhat analogous class obtained by treating carbon dioxide or carbon monoxide in the presence of hydrogen or an olefine, with steam, or by causing a metallic alkoxide or a halogenated hydrocarbon to react with chloroacetic acid, or with potassium cyanide, and saponifying the product thus obtained. Such products or mixtures thereof, having at least 8 and not more than 32 carbon atoms, and having at least one carboxy group or the equivalent thereof, are as suitable for use as the conventional detergent-forming monocarboxy acids, and another analogous class equally suitable, is the mixture of carboxylic acids, obtained by the alkali treatment of alcohols of higher molecular weight formed in the catalytic hydrogenation of carbon monoxide. The synthetic carboxy acids so obtained can be converted into high molal amines by the same procedure as employed for the conversion of other carboxy acids.

The patents previously referred to indicate a large number of suitable amines which are the type previously specified. For the sake of brevity, reference will be made only to certain primary amines. Obviously, secondary amines could be derived from such primary amines by introducing alkyl groups having less than eight carbon atoms, such as methyl, ethyl, propyl, butyl groups, and the like; or one might introduce radicals in which the carbon atom chain was interrupted at least once by oxygen, as for example, radicals derived by reacting an amine with compounds, such as $C_2H_5OC_2H_4Cl$ or $OHC_2H_4OC_2H_4Cl$. An aralkyl group, such as a benzyl group, might be introduced, or an alicyclic group, such as a cyclohexyl group. A tertiary amine will serve, provided that it has a suitable hydroxylated hydrocarbon radical present.

The primary amines which may be used as such or converted into secondary amines include the following: Octadecenylamine, cetylamine, stearylamine; oleoamine; ricinoleoamine; amines derived from naphthenic acids; amines derived from octadecadiene 9, 11-acid-1; octadecylamine; amines derived from mixed unsaturated fatty acids, such as soyabean fatty acids; cottonseed oil fatty acids; linseed oil fatty acids; heptadecylamine, hexadecylamine; dodecylamine; decylamine, etc.

Having obtained primary or secondary amines of the kind described, such amines are treated with an oxyalkylating agent, preferably ethylene oxide. Other oxyalkylating agents may be used. As typical examples of applicable compounds may be mentioned epichlorhydrin, glycid alcohol, ethylene oxide, propylene oxide, butene-2 oxide, butene-1 oxide, isobutylene oxide, butadiene oxide, butadiene dioxide, chloroprene oxide, isoprene oxide, cyclohexylene oxide, cyclopentene oxide, etc.

It is to be noted that the same oxyalkylation agent need not be employed throughout the entire oxyalkylation process. For instance, the secondary amine dioctylamine might be reacted with one mole of ethylene oxide, and two moles of propylene oxide, or such compound might be treated with one mole of glycid, and then with 2 or 4 moles of ethylene oxide. It would be equally feasible to use 2 moles of ethylene oxide, and then one mole of glycid. This same procedure could be applied just as effectively to primary amines. Its special significance is as follows: If a secondary amine indicated by

is treated with 2 moles of ethylene oxide to give

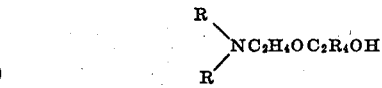

such product could then be treated with one mole of glycid to give a diol group as follows:

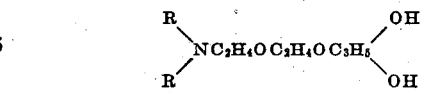

Such product has the advantage that after being reacted with a low molal monocarboxy acid, there is present an available hydroxy radical for further reaction.

Previous reference has been made to the fact that many of the amines herein contemplated as reactants may be considered conveniently as derivatives of high molal monocarboxy acids, and particularly higher fatty acids. Some of these higher fatty acids, such as hydroxystearic acid, ricinoleic acid, dihydroxystearic acid, dichlororicinoleic acid, etc., may contain at least one hydroxyl radical. If such products are converted into amines, the radicals R in the formulae immediately preceding, also include an additional alcoholic hydroxyl radical.

As will be indicated hereafter, the low molal acid which reacts with an alcoholic hydroxyl group, may also, in turn, contain a reactive hydroxyl radical, as in the instance of lactic acid or hydroxyacetic acid, or the like.

For instance, reference is made to U. S. Patent No. 2,174,762, dated October 3, 1939, to Schuette et al. Said patent is concerned with oxyethylation of amines to a degree sufficient to produce water solubility. In the present instance the number of recurring ether linkages in any single chain is preferably limited to 3, and water solubility may or may not occur. In other words, an oxyethylated high molal amine which is water insoluble may serve as an intermediate reactant.

See also U. S. Patent No. 2,195,194, dated March 26, 1940, to Ulrich et al. As to methods which can be readily adapted for the oxyalkylation of high molal amines, as herein contemplated, see U. S. Patent No. 2,275,470, dated March 10, 1942, to Ruark, and U. S. Patent No. 2,337,004, dated December 14, 1943, to Schwoegler.

The following reactants are included purely by way of illustration, and the description is substantially that appearing in the indicated patents.

High Molal Amino-Polyglycol
Example 1

1 molecular proportion of dodecylamine is caused to react with 2 molecular proportions of epichlorhydrin which are added to the reaction mixture in small portions, 2 molecular proportions of propylene oxide then being brought into reaction at zero degrees C. in the presence of 0.5 percent of sodium ethylate. The reaction can also be conducted conveniently if suitable caution is employed and at the same temperature, or slightly higher temperature, by using glycid instead of the epichlorhydrin. This has the advantage that no hydrochloric acid is liberated to form a salt.

High Molal Amino-Polyglycol
Example 2

1 molecular proportion of cetylamine is heated in an autoclave under pressure at about 150° C. with 4 molecular proportions of propylene oxide, and then with 2 molecular proportions of ethylene oxide. (See Examples 1 and 2 of aforementioned U. S. Patent No. 2,174,762.)

High Molal Amino-Polyglycol
Example 3

A mixture of dicetyl- and dioctadecyl-ethanolamine polyethylene glycol is obtained by the action of 3 molecular proportions of ethylene oxide on about 1 molecular proportion of a technical mixture of dicetylamine and dioctadecylamine. (See Example 1 of aforementioned U. S. Patent No. 2,195,194.)

High Molal Amino-Polyglycol
Example 4

A mixture of 150 parts of N-stearyl-B,B',B''-trihydroxy-tert. butylamine with 45 parts of ethylene oxide (2.65 molecular equivalents) is heated in a closed vessel by raising the temperature to 120° C. uniformly during 5 hours, and then keeping at this temperature until the internal pressure falls to zero. (See U. S. Patent No. 2,091,105, dated August 24, 1937, to Piggott.)

High Molal Amino-Polyglycol
Example 5

One pound mole of octadecylamine is reacted with 8 moles of ethylene oxide in the manner described under Example 1, in British Patent No. 390,851, to I. G. Farbenindustrie A.-G., dated July 29, 1932. Attention is also directed to said patent insofar that it enumerates other high molal basic amines suitable for oxyalkylation.

Having obtained suitable high molal amino-polyglycols of the kind previously described, such products are subjected to esterification with low molal monocarboxy acids having 7 carbon atoms or less. Some of such acids have been previously described in characterizing the acyl radical $R_3CO$. Additional examples of the hydroxylated type have been mentioned. Other suitable acids, include furoic and unsaturated acids, such as acrylic, crotonic, tiglic, etc.

The esterification reactions are conducted in the usual manner. In such instances where there are two polyglycol radicals present, one may introduce a low molal acyl radical as a substituent for each terminal hydrogen atom. It is our preference to select low molal acids having boiling points between approximately 150° and 220° C. The reaction can be conducted employing a considerable excess of such low molal acids and refluxing at the boiling point of such acids for approximately 5 to 15 hours. The reaction can also be conducted by means of an obvious equivalent, such as an anhydride or other suitable derivative.

In the instance of acids having boiling points in excess of 175° C., for instance, normal caproic acid, it is our preference to add a stoichiometric equivalent and conduct the reaction until the amount of water eliminated is equal to, or almost equal to, the theoretical yield. Hydroxyacetic acid may be employed in the same manner.

In the following examples reference is made to the use of certain low molal acids. Actually, the esterification reaction can be accelerated by use of the anhydride, i. e., using one mole of the anhydride to replace 2 moles of acid. However, in such instance where there is no objection to excess acid, and where the excess acid or excess anhydride is subsequently removed, one may replace each mole of acid by one mole of anhydride. Particular reference is concerned with the use of acetic anhydride, propionic anhydride, n-butyric anhydride, isobutyric anhydride, n-valeric anhydride, n-caproic anhydride, and particularly the last five where the boiling points of the anhydrides vary from 169° to 242°. When the corresponding acid is formed, such acid may serve as a reactant in the esterification reaction, or can be removed by vacuum distillation. Reference has been made to the acids only because they are more generally available, but where the acyl chloride is available, the anhydrides can be obtained from the acyl chlorides and the salt, or by other suitable means.

It has been pointed out that the herein contemplated amines used as reactants are basic in character. Thus, the initial reaction between the amine and the low molal carboxy acid, results in salt formation. The esterification reaction involves the elimination of water from the salt. However, the esterified amine herein contemplated is still basic in character, and combines with acids, particularly inorganic acids, to form salts, and this has been pointed out previously in the hereto appended claims. Reference to the amines is intended to include the anhydro base, the hydrated base, i. e., the ammonium form, or any suitable salt, including salts of the various low molal carboxy acids herein contemplated as reactants. This means, among other things, where an excess of the low molal acid or anhydride is used for esterification, as much as a mole of such acid may be retained, insofar that the esterified high molal aminopolyglycol may be in essence a salt and not the anhydro base. The salts of the low molal acids tend to revert to the free base and the acid itself under such conditions which tend to remove the acid, i. e., vacuum distillation. The salt form, particularly the salts of the low molal carboxy acids, are perfectly satisfactory for the purpose hereing contemplated. When dissolved in solutions of stronger acids such as sulfuric acid, hydrochloric acid, phosphoric acid, nitric acid, etc., an acid exchange reaction takes place and such solution may be particularly effective for those purposes wherein an acidic combination is indicated.

ESTER OF HIGH MOLAL AMINO-POLYGLYCOL

*Example 1*

1 pound mole of the product described under the heading "High mold amino-polyglycol, Example 3" is heated with 4 pound moles of isobutyric acid for approximately 8 to 18 hours at 150–154° C. The esterification is conducted by means of a hot condenser, that is, a condenser with the temperature regulated so as to be maintained at approximately 105° C. to 112.5° C. Such arrangement permits the elimination of much, if not all, of the water of esterification, but condenses and returns substantially all the butyric acid for further reaction. The progress of the esterification reaction can be followed by use of a second trap condenser to retain and measure the water of reaction. Such water should be titrated for determination of any acid which may have distilled over. At the end of such esterification period, the excess butyric acid is eliminated by distillation and, if preferred, vacuum distillation may be employed. The amount of base required for saponification of the ester, is of course a means of measuring the degree of esterification. Saponification re-liberates the butyric acid, both from the salt form and the ester form. The product shows excellent solubility in dilute acetic acid or dilute mineral acid. The product derived from commercial raw materials is an amber-colored viscous or sticky compound at ordinary room temperature, and if contaminated by the presence of metallic iron or the like, may show even a darker appearance. The inorganic salt forms are more solid in nature, than the anhydro base. Such appearance is typical of the entire class of materials herein described.

ESTER OF HIGH MOLAL AMINO-POLYGLYCOL

*Example 2*

The high molal amino-polyglycol described under the heading of Example 1, is substituted for the high molal amino-polyglycol used in the preceding example. Insofar that this particular compound, being derived from a primary amine, contains 2 hydroxyl groups, one employs double the amount of low molal acid or anhydride, and the reaction is complete when two low molal acyl groups have been introduced into the aminopolyglycol nucleus.

ESTER OF HIGH MOLAL AMINO-POLYGLYCOL

*Example 3*

The same procedure is followed as in the preceding example, except that a product of the kind described under the heading "High molal amino-polyglycol, Example 2" is substituted for the amino-polyglycol employed in the previous example.

ESTER OF HIGH MOLAL AMINO-POLYGLYCOL

*Example 4*

The same procedure is followed as in the two preceding examples, with the exception that instead of using 8 moles of the low molal acid per mole of amino-polyglycol, one employs only a single mole, i. e., sufficient low molal acid to convert only one hydroxyl radical into an ester radical. Under such circumstances, the yield may not be as large as in preceding examples, and there may be some minor portions of uncombined reactants remaining in the final product. This does not interfere with the use of the compounds for various purposes, as hereinafter described. One mole of anhydride may be used for two moles of amino-polyglycol.

ESTER OF HIGH MOLAL AMINO-POLYGLYCOL

*Example 5*

Esterification is conducted by means of an acid having a substantially higher boiling point, such as normal caproic acid. Under such instances, no excess of acid is necessarily added and one may use either one mole of acid or two moles of acid, depending on whether there are as many as two hydroxyl radicals present per mole of amino-polyglycol, and also depending upon whether or not one desires to convert both hydroxyl radicals, if present, into ester radicals. The temperature of esterification is approximately 175° to 195° C., and the condenser employed is a cold condenser with suitable arrangement to trap the water of esterification as formed, and also return any unreacted acid for further reaction. (Such arrangement is suitable where the acid is volatile and water-insoluble.) There is no difficulty in regard to the loss of the low molal acid, because, although it is volatile at the indicated temperature, it is readily condensible. Thus, as specific procedure illustrating the present example, one may use 1 mole of amino-polyglycol, Example 3, preceding, and 1 mole of caproic acid, or else 1 mole of the other, previously employed, amino-polyglycol; one may employ 2 moles of caproic acid in such instances where it is desired to convert both hydroxyl radicals into ester radicals.

ESTER OF HIGH MOLAL AMINO-POLYGLYCOL

*Example 6*

The same procedure is employed as in the previous example, except that anhydrous hydroxyacetic acid is employed instead of caproic acid. One obtains the monohydroxyacetate if the high molal amino-polyglycol, Example 3, preceding, is employed, and one may obtain either the monohydroxyacetate or the di-hydroxyacetate, as previously explained, in the event that other polyhydric amino-polyglycols are employed.

Previous reference has been made to high molal amino-polyglycols as reactants, for the reason that it is our preference to employ products in which there is at least one ether linkage obtained by the use of 2 or more moles of ethylene oxide per aminohydrogen atom. If desired, however, one may employ a single mole of the oxyalkylating agent, such as ethylene oxide, for each available aminohydrogen atom. In such event, the product obtained is not a polyglycol, but an aminoalcohol, insofar that there is a single alkylene radical present and no ether linkage. Such type of reactant may be employed in the present instance, if desired. Regardless of what type of reactant is employed, the final product is invariably soluble in or produces a colloidal salt in dilute acetic acid or dilute mineral acid. Completeness of reaction can be checked in each instance in the manner previously indicated.

In the case of hydroxyacetic acid, one may use a distinctly higher temperature without volatilization of the acid than in the instances where caproic acid is employed. For instance, the esterification involving hydroxyacetic acid may employ a temperature as high as 215° C.

Many of the preceding examples will be found to be soluble in water, even in the absence of acid. Some of the products are soluble in or produce a turbid sol or suspension in gasoline, kerosene, benzene, or cresol.

Previous reference has been made to the use of the anhydride as an acylating agent, instead of the free acid. Probably salt formation is eliminated until esterification begins with liberation of a molecule of acid for each molecule of anhydride added. The liberated acid acts, of course, as if it had been added at the beginning of the reaction, and additionally, presents a modification, in that water is not eliminated, unless esterification takes place by virtue of the free acid. If, however, the entire esterification reaction involves only the anhydride and no acid, water would not be liberated. Thus, the measurement of the condensed water, if any, under such circumstances, is not necessarily an index of esterification. Other procedure must be used, although unfortunately, no method of measurement is available which is relatively quick and absolutely satisfactory to a precise and quantitative degree. If a salt is formed, titration with caustic soda or potash converts the salt into the free base. The particular end point using the usual indicators is rather indefinite, and thus the use of additional alkali to determine the saponification value results in a determination of somewhat approximate value, due to such difficulties of manipulation. The values obtained, however, even though only approximate, are perfectly satisfactory for the present purpose. Other suitable procedure, but more laborious, involves the saponification of the product followed by acidification with a non-volatile mineral acid, e. g., sulfuric acid, and distillation of the low molal carboxy acids which were originally combined in ester form, or salt form, followed by the usual volumetric procedure in correlation to the original sample.

The following reactions illustrate the formula of the high molal aminoalcohols and amino-polyglycols and also their esterification products, without reference to the formation of the hydrated base or of a salt form of the anhydro base. In the subsequent structural illustrations, where $R_1$ appears, it is assumed, for convenience, that $R_1$, in such instance as illustrated, does not include a hydroxyl radical. Oxyalkylation, under such circumstances, must, of necessity, involve the amino-hydrogen atom. Actually, it would not matter if the radical indicated by $R_1$ does contain a hydroxyl radical, for the reason that the linkage involving a hydrogen atom and an amino nitrogen atom, as contemplated in the herein described reactants, appears to be more susceptible to oxyalkylation than the hydrogen oxygen linkage of the hydroxyl group. After the first mole of oxyalkylating agent is introduced into the amino hydrogen position, whether it be ethylene oxide or glycid, the resulting radical is the equivalent of $R_1$ in such instances where $R_1$ does contain an alcoholic hydroxyl group. It would not matter if the next mole of oxyalkylating agent attacked the hydroxyl of $R_1$, or the hydroxyl of the alcoholic group which replaced the amino hydrogen atom. Stated in another way, if $R_1$ is a hydroxylated radical, then $R_2OH$ and $R_1$ would be the equivalent of each other, and $R_3COOH$ in the resulting esterification reaction would combine as readily in most instances with the $R_1$ radical as with the $R_2OH$ radical. One must not lose sight of the fact that esterification must involve a tertiary amine, and thus, eliminate amidification as a possible reaction. If $R_1$ does contain an alcoholic hydroxyl and is reactive, and if the amine is the secondary amine, then in each instance the reaction must be conducted by use of suitable quantities of an alkylating agent so as to eliminate the amino hydrogen atom.

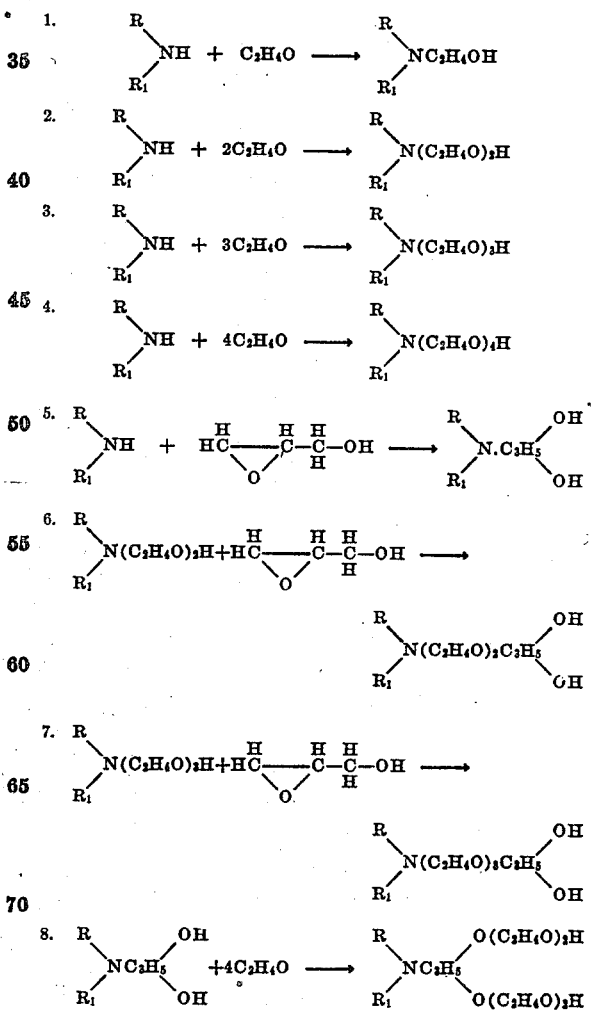

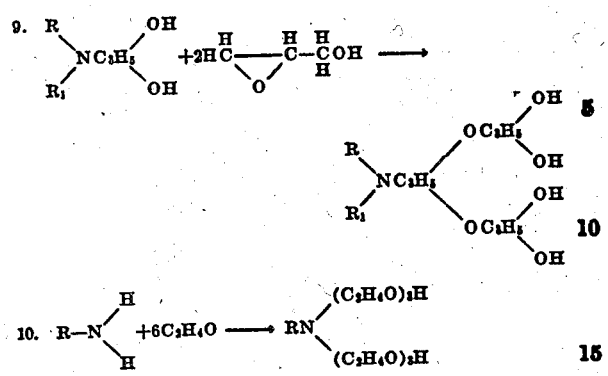
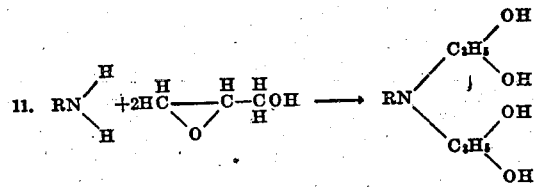
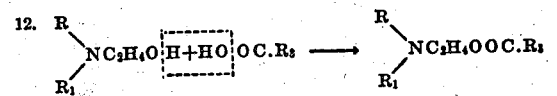
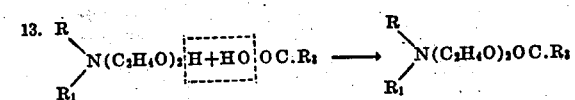
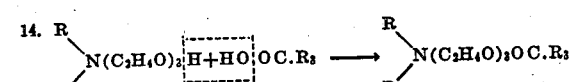
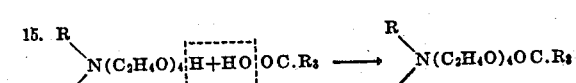
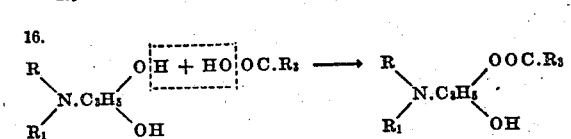
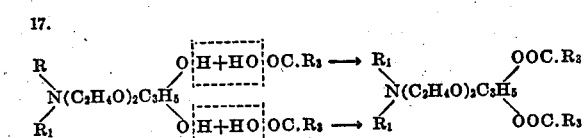
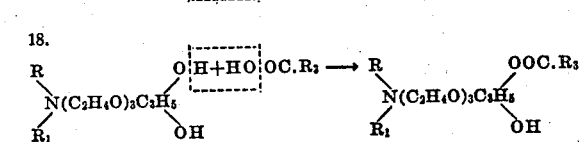
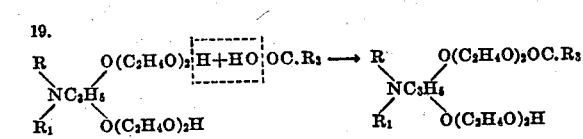
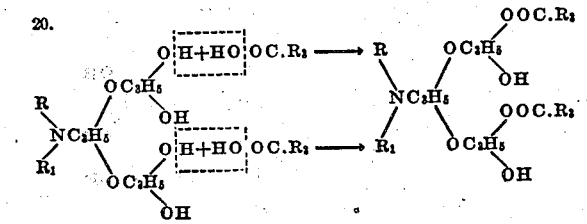
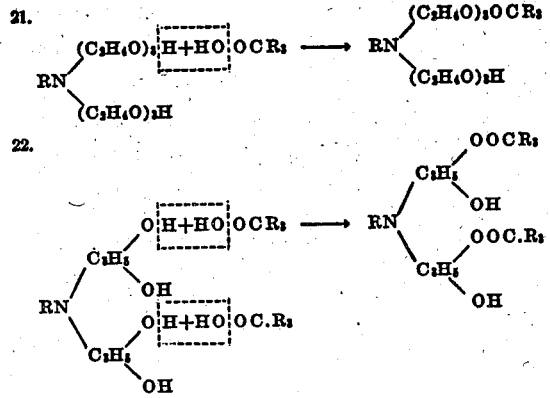
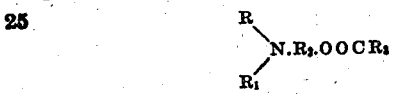

(As will be noted, in such instances where butylene oxide replaces ethylene oxide, the number of carbon atoms in the polyglycol attached to the amino nitrogen N may be as high as 15.)

In light of the previous description and formulas, the structure of the compounds originally presented may be written as follows:

$$\begin{array}{c} R \\ \diagdown \\ N.R_2.OOCR_3 \\ \diagup \\ R_1 \end{array}$$

in which R is a monovalent hydrocarbon radical free from ether linkages and having at least 8 carbon atoms and not more than 32 carbon atoms, and a member of the class consisting of aliphatic hydrocarbon radicals, alicyclic hydrocarbon radicals, and aralkyl hydrocarbon radicals; $R_2$ is a divalent radical having less than 16 carbon atoms and not more than 3 ether linkages, and a member of the class consisting of alkylene radicals, hydroxyalkylene radicals, alkyleneoxy radicals, hydroxyalkyleneoxy radicals, polyglycol and hydroxy polyglycol radicals, in which any alkylene radicals present are selected from the group consisting of ethylene, propylene, butylene, and methylpropylene; and $R_1$ is a monovalent radical and a member of the class consisting of aliphatic hydrocarbon radicals, alicyclic hydrocarbon radicals, aralkyl hydrocarbon radicals having not more than 32 carbon atoms and the monovalent $HOR_2$ wherein $R_2$ has its prior significance; $R_3CO$ is an acyl radical of a low molal monocarboxy acid having less than 8 carbon atoms.

Thus, the products herein contemplated are preferably obtained from ethylene oxide, propylene oxide, butylene oxide, glycid and methyl glycid.

In view of the lower cost of primary amines in comparison with secondary amines, it is our preference to employ hydroxylated amines obtained by the oxyalkylation of primary amines, and particularly, those in which the amine radical R is derived from higher fatty acids, and especially those having 18 carbon atoms.

Reference to an esterified aminoalcohol and to the other aminoglycol or aminopolyglycol compounds herein contemplated, is intended to include the salts and the anhydro base, as well as the hydrated base, since both obviously are present when an emulsion is treated with an amine or amino compound. ("In an aqueous solution of the amine, the anhydro base, $R-NH_2$, the hydrated base, $R-NH_3-OH$, and the two ions are all present." Richter, v. s., p. 252.)

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our herein described process for resolving petroleum emulsions, may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent employed in our process, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways or by any of the various apparatus now generally used to resolve or break petroleum emulsions with a chemical reagent. The above procedure may be used either alone, or in combination with other demulsifying procedure, such as the electrical dehydrating process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

Reference is made to our co-pending applications, Serial Nos. 542,234, 542,235, 542,236, 543,-237 and 543,238, filed June 26, 1944.

Since the herein described products are esters, it is hardly necessary to point out that saponification decomposes the product into its original components, to wit, an amine and an acid or acids. Actually, the acids are obtained in the form of salts, usually the sodium or potassium salts. Such conversion into the original components or simple modifications thereof results in products which can be examined in the customary manner, and thus serve to identify the esterified amino alcohol.

Having thus described our invention, what we claim as new and desire to secure by Letters Patent is:

1. A process for breaking petroleum emulsions of the water-in-oil type, characterized by subjecting the emulsion to the action of a demulsifying agent comprising a basic esterified aminoalcohol of the formula:

in which R is a monovalent radical free from ether linkages and having at least 8 carbon atoms and not more than 32 carbon atoms and a member of the class consisting of aliphatic hydrocarbon radicals, alicyclic hydrocarbon radicals and aralkyl hydrocarbon radicals; $R_2$ is a divalent radical having less than 16 carbon atoms and not more than 3 ether linkages and a member of the class consisting of alkylene radicals, hydroxyalkylene radicals, alkyleneoxy radicals, hydroxyalkyleneoxy radicals, polyglycol and hydroxy polyglycol radicals in which any alkylene radicals present are selected from the group consisting of ethylene, propylene, butylene and methylpropylene; and $R_1$ is a monovalent radical and a member of the class consisting of aliphatic hydrocarbon radicals, alicyclic hydrocarbon radicals, aralkyl hydrocarbon radicals having not more than 32 carbon atoms and the monovalent radical $HOR_2$, wherein $R_2$ has its prior significance; $R_3CO$ is an acyl radical of a low molal monocarboxy acid having less than 8 carbon atoms.

2. The process of claim 1, wherein the number of carbon atoms in any alkylene radical does not exceed 3.

3. The process of claim 1, wherein the number of carbon atoms in any alkylene radical does not exceed 3 and R is aliphatic.

4. The process of claim 1, wherein the number of carbon atoms in any alkylene radical does not exceed 3 and R is alicyclic.

5. The process of claim 1, wherein the number of carbon atoms in any alkylene radical does not exceed 3 and R is aralkyl.

MELVIN DE GROOTE.
BERNHARD KEISER.